INVENTOR.
ANTHONY R. COSTANTINI
BY ANTHONY Di ANGELUS
Attorney

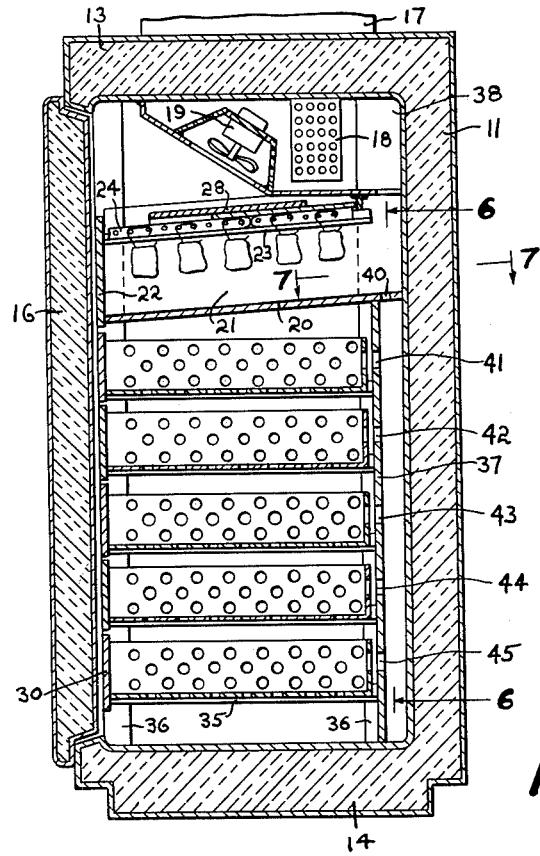
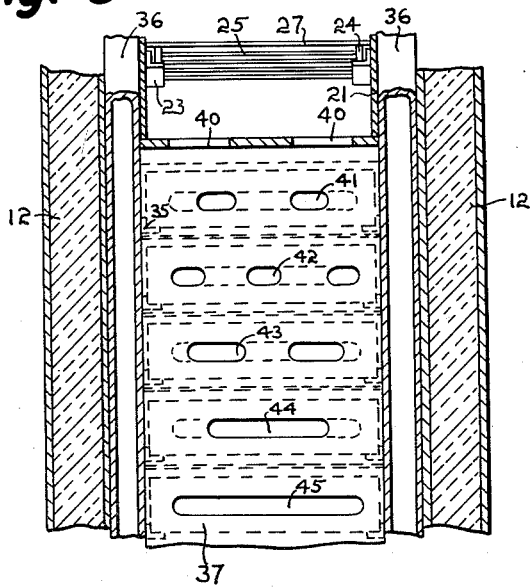
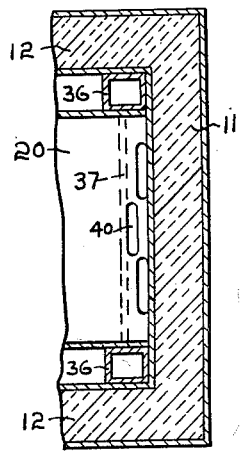

United States Patent Office 3,019,620
Patented Feb. 6, 1962

3,019,620
REFRIGERATING APPARATUS
Anthony R. Costantini, Philadelphia, and Anthony Di Angelus, Havertown, Pa., assignors to Victory Metal Manufacturing Company, doing business as Victory Metal Manufacturing Corporation, Plymouth Meeting, Pa., a corporation of Pennsylvania
Filed Nov. 14, 1960, Ser. No. 69,110
13 Claims. (Cl. 62—418)

This invention relates generally to refrigerating apparatus, and more patricularly, it relates to apparatus for freezing and storing whole human blood and the like for use at a future time.

As is well known, advances in medical techniques and knowledge have shown the practicality of storing human blood over some considerable periods of time for use as the need may arise to provide a quickly available source of whole blood for transfusions to patients seriously ill and requiring the same. The conditions under which blood may be satisfactorily stored without deterioriation are not the same as those which are satisfactory for the storing of food products, for example, the storage temperature and time within which freezing of the blood must be accomplished being quite critical factors with regard to the future useability of the frozen and stored blood. When blood is withdrawn from a donor it is, of course, at the normal body temperature of 98.6° Fahrenheit and will generally have cooled to approximately 90° Fahrenheit when it is shortly thereafter placed in the freezing apparatus. It has been medically determined that freezing of the blood to a maximum temperature of minus one degree Fahrenheit must be accomplished within a period of six hours and that it is preferable that the frozen blood be stored thereafter at even a lower temperature. Accordingly, it is a primary object of this invention to provide novel apparatus for rapidly freezing relatively large volumes of blood within a short time to preclude the breakdown of the blood itself.

Another object of this invention is to provide novel apparatus for quickly and efficiently freezing large volumes of blood and which also includes storage provisions for storing the already frozen blood so that it is available for future use.

Yet another object of this invention is to provide novel apparatus for freezing blood, which apparatus includes a provision for storing many times the volume of blood being frozen at any given instant.

Still another object of this invention is to provide novel apparatus for freezing blood, which apparatus under the most severe working conditions is able to freeze a maximum capacity of blood within a predetermined fixed time interval below a maximum predetermined allowable temperature.

A further object of this invention is to provide novel apparatus for the freezing and storing of whole blood which includes a blood storage section for already frozen blood and which includes a special compartment for freezing of the blood, the special freezing compartment being designed in a novel manner so that freezing efficiency is materially increased and the freezing time materially reduced without the necessity for increasing the B.t.u. capacity of the refrigerating apparatus itself.

Yet another object of the present invention is to provide a novel blood freezing and storing apparatus as aforesaid which incorporates therein a novel air distribution system providing substantially uniform temperature throughout the inside of the apparatus by balancing the resistance to flow encountered by the refrigerating air as the air moves through the apparatus over different flow paths.

The foregoing and other objects of the invention will become apparent from a reading of the following specification in conjunction with an examination of the appended drawings, wherein:

FIGURE 5 is a vertical sectional view similar to FIGURE 2 but illustrating the same general apparatus with a somewhat different freezer compartment air distribution ducting system;

Figure 1:
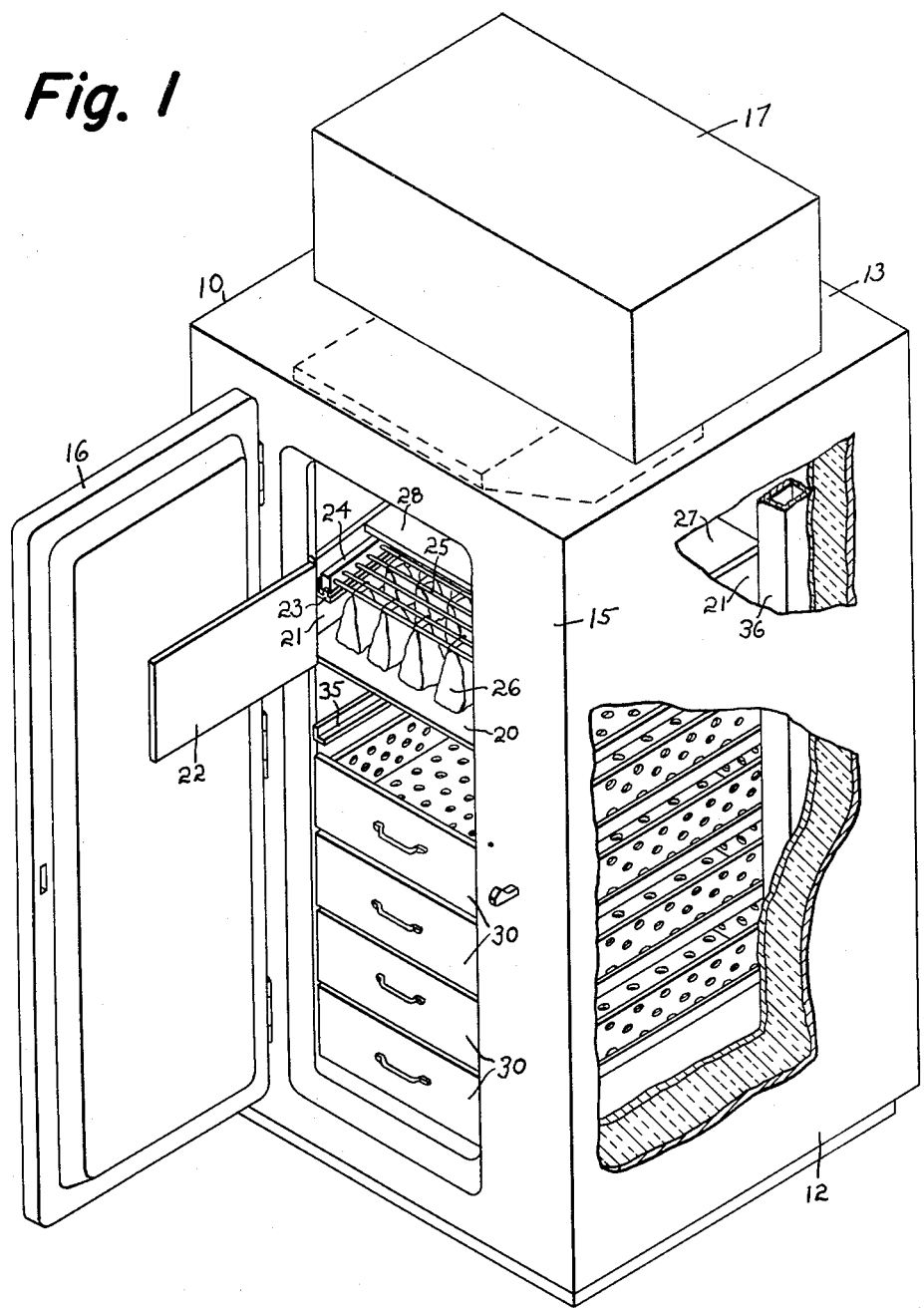
FIGURE 1 is a front perspective view of the novel apparatus according to the invention with the door of the apparatus shown in opened out position and portions of one side wall being sectioned away to reveal certain details of the internal construction.

FIGURE 6 is a fragmentary vertical sectional view as would be seen when viewed along the lines 6—6 of FIGURE 5 and illustrates certain important details of the storage section air distribution ducting system; and FIGURE 7 is a fragmentary horizontal sectional view of the apparatus as would be seen when viewed along the lines 7—7 of FIGURE 5 and illustrates certain details of the novel rear ducting system not readily apparent from the showings of FIGURES 5 and 6.

In these several figures, like elements are denoted by like reference characters.

Referring first to FIGURES 1 through 4, there will be seen the refrigerating apparatus designated generally as 10 having a rear wall 11, side walls 12, top wall 13 and bottom wall 14. The front wall 15 is suitably provided with a door opening closeable by the door 16. The wall constructions are of the usual type and consist of an outside wall panel and an inwardly spaced liner with the space between filled with insulating material. The refrigerating apparatus readily breaks down for purposes of explanation into four separate aspects, namely the air cooling unit, the blood freezing compartment, the frozen blood storage drawers and the ducting system for circulating cold air throughout the interior of the apparatus. The modification illustrated in FIGURE 5 differs from the apparatus of FIGURE 2 only in the particular air distribution system employed in the freezing compartment, the cooling system, freezing compartment and storage sections being otherwise fundamentally identical.

The air cooling system includes the usual condensing unit 17, cooling coils 18 and fan or blower 19. The condensing unit 17 is externally top mounted on the apparatus 10 to conserve interior space and to provide ready accessibility for servicing, and the cooling coils 18 and blower 19 are top mounted in the interior of the apparatus to provide a generally circular flow of air downward through the back region of the apparatus and then forward and upward therethrough, the downward flowing rear air being that just cooled by the cooling coils 18 and the upward flowing return air being drawn into the blower 19 and passed backward through the cooling coils 18 for recirculation. The actual flow paths of the circulating air will appear more fully hereinafter subsequent to a description of the freezing compartment and storage section of the apparatus, at which point the air distribution system will be more readily understandable.

The freezing compartment is located immediately below the cooling coils 18 and the blower 19 and includes an imperforate floor 20, a pair of imperforate opposite side walls 21, an imperforate front closure door 22 and an open rear and top. Fixedly secured to the side walls 21 and running from front to rear of the compartment are a pair of parallel forwardly and downwardly inclined tracks 23 upon which are disposed for sliding motion into and out of the apparatus a pair of side rails 24. Extending horizontally across the freezing compartment, between and secured to the side rails 24, are a plurality of parallel extending hanger rods 25 which together with the side rails 24 form a hanger rack from which the containers of blood to be frozen are suspended. The containers are illustrated in the figures as 26 and are seen to be hung in horizontal rows across the width of the freezer compartment. Each horizontal row of blood bags is observed to hang at a somewhat lower elevation than the row immediately behind it which is disposed toward the rear of the freezing compartment by virtue of the forwardly and downwardly inclined slope of the tracks 23 which cause the hanger rods 25 to assume the same sloping relationship. The provision of this slope is quite important and materially decreases the length of time required to freeze the blood in the bags 26, in the manner to be subsequently set forth.

Extending across the top of the freezer compartment above the side rails 24 is an imperforate top closure panel 27 which extends forward from the rear end of the freezing compartment to a point short of the front of the compartment so that any air travelling forward through the compartment from the rear thereof may only emerge upward in the compartment front region. Slidably overlying the imperforate top panel 27 is a secondary top panel 28 which extends across the freezing compartment from one side to the other and which may be slid forward to completely close the top of the freezing compartment and prevent any air from effectively passing upward therethrough. When blood is being frozen in the freezing compartment the secondary top panel 28 is slid rearwardly over the panel 27 to provide the top front opening as aforementioned, but when no blood is being frozen within the compartment then the secondary top panel 28 is slid forward to close the compartment, for reasons which will be subsequently described. Finally, it should be noted that the depth of the freezing compartment is such that the floor 20 is spaced substantially below the bottoms of the blood bags 26 hung upon the hanger rods 25 in order to allow for free forward flow through the compartment of the low temperature air used to effect the freezing of the blood.

Figure 2:
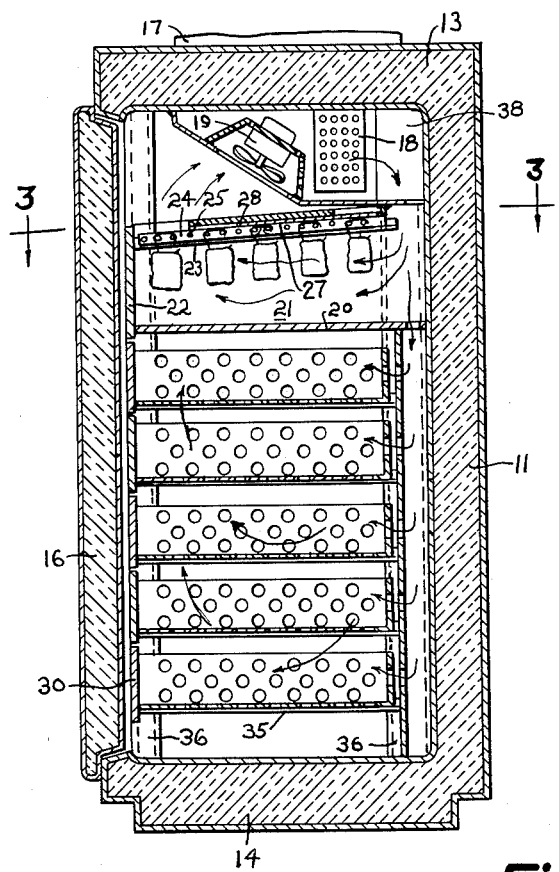
FIGURE 2 is a vertical sectional view through the apparatus of FIGURE 1 with the front door of the apparatus in closed position.
Figure 3:
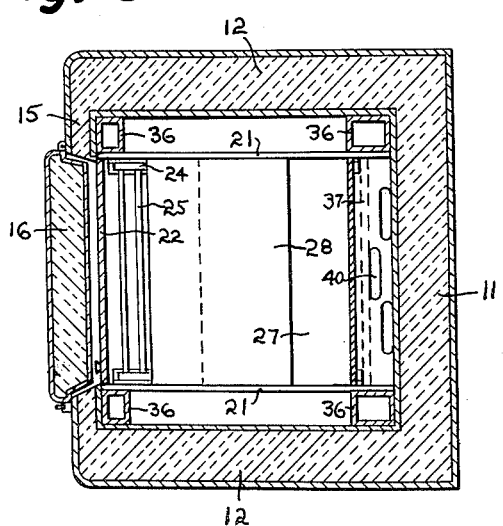
FIGURE 3 is a horizontal sectional view through the blood freezing compartment of the apparatus of FIGURE 1 and as would be seen when viewed along the lines 3—3 of FIGURE 2.
Figure 4:
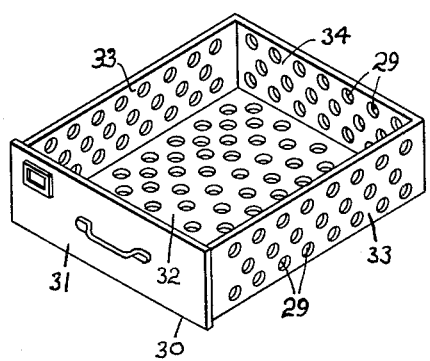
FIGURE 4 is a top perspective view of one of the frozen blood storage drawers located in the apparatus below the freezing compartment.

The space below the freezing compartment is taken up by the storage section, which as illustrated comprises five stainless steel drawers 30 each of which is composed of an imperforate front wall 31 and bottom, sides and back walls 32, 33 and 34 respectively perforated as at 29. Each of the drawers 30 is disposed upon a pair of parallel front-to-rear extending slides 35 secured to the four corners pilasters 36 and spaced inwardly from the side walls 12 of the apparatus by the width of the pilasters. As best seen in FIGURES 1 and 2, the vertical height of the front walls 31 of the drawers 30 is such that while these front walls of the vertically spaced drawers do not actually touch one another, the spacing between the top edge of one drawer front wall and the bottom edge of the above lying drawer front wall is relatively small, so that cold air circulating through the drawers has very little tendency to move forward between the front walls of the drawers but rather is constrained to move upward and outward through the perforations in the bottoms and side walls of the drawer.

The air distribution system illustrated in the embodiment of the apparatus shown in FIGURES 1 through 4 includes the air cooling system embracing the cooling coils 18 and blower 19, the freezing compartment and the below lying storage compartment holding the perforated drawers 30, and a duct system 37 extending across the rear wall between the rear corner pilasters 36 which duct extends vertically downward behind the storage section from an upper terminus at the floor of the freezing compartment. The floor 20 of the freezing compartment is apertured, at at 40, to provide a flow path into the duct 37 for the cold air sweeping down into the rear of the freezing compartment from the compartment 38 at the rear of the cooling coils 18. The cold air passing down into the duct 37 through the apertures 40 is distributed forward at all levels into the storage section through the variable area ports 41 to 45. The cold air then sweeps forward through the perforated drawers 30 and around any of the frozen blood bags stored therein and upward along a return path to the blower 19. It will, of course, be understood that the cold air flowing upward through the perforated drawers 30 also flows outward through the sides 33 and upward alongside of the drawers to the blower 19 because the imperforate freezing compartment floor 20 prevents direct upflow therethrough. The cold air from the compartment 38 is conducted directly inward and forward through the open rear of the freezing compartment, around and between the blood bags 26 and upward in return circuit to the blower 19 through the top front opening of the freezing compartment provided by the rearwardly slid secondary top panel 28. The ratio of area to perimeter for each of the duct apertures 41 to 45 is so chosen that progressively less resistance to air flow therethrough is exhibited by successively lower positioned apertures. This graded resistance structure provides a proper proportion of air flow through each of the apertures effective to result in substantially uniform temperature throughout the storage section.

Under conditions where the freezing compartment is being utilized to freeze blood stored in the bags hung therein, it will be appreciated that it is desirable for the major portion of the cold air circulation to take place through the freezing compartment because the blood placed in the freezing compartment is at a relatively high temperature and must be reduced from about 90 degrees Fahrenheit to a maximum of minus one degree Fahrenheit within a six hour period. On the other hand, any blood which may be in the storage section drawers 30 is already in a frozen state and at a very low temperature so that a much smaller fraction of the cold air from the cooling coils 18 need be directed to the stored frozen blood bags in order to maintain them at their lower temperature. After freezing of the blood in the freezing compartment has been completed, the frozen blood bags are removed therefrom and placed in one of the storage drawers 30. If no additional blood is ready for freezing at that time, or if all of the storage drawers are completely filled, then the secondary top panel 28 is slid forward to close the top of the freezing compartment and thus effectively block circulation of air from the compartment 38 through the freezing compartment and back to the blower 19. With the air flow through the freezing compartment thus blocked, a larger volume of cold air flows down through the rear wall duct 37 and through the storage section with the result that the temperature inside of the apparatus eventually stabilizes at approximately minus 22 degrees Fahrenheit.

The worst condition encounterable is when one of the storage drawers 30, as for example the bottommost drawer, contains stored frozen blood and a new volume of warm blood is placed into the freezing compartment for the quick freezing thereof. Under this condition, there is relatively little low temperature thermal mass within the apparatus to help maintain the temperature of the storage compartment at a satisfactory low point while the relatively high temperature blood in the freezing compartment is being reduced in temperature. Under this worst condition the apparatus according to the invention is able to hold the temperaure in the storage section at a maximum of minus one degree Fahrenheit when the fresh warm blood is first placed into the freezing compartment, this situation continuously improving as the fresh blood is gradually reduced in temperature during the course of freezing.

Returning now to a consideration of the freezing compartment, it will be recalled that the tracks 23 are inclined forwardly downward to provide a slope of the same type for the hanger rods 25 set into the side rails 24 and that the floor 20 is also sloped in a corresponding manner. In actual practice it has been found that a slope corresponding to a fall of two inches in twenty-six inches, or approximately five degrees provides a decrease in the requisite freezing time of approximately forty-five minutes with the given apparatus tested. This effect is believed to be achieved by virtue of the fact that the forward moving air entering the rear of the freezing compartment is not forced to travel through all of the rearwardly located blood bags before reaching the more forwardly disposed units, and hence the air reaching the forward mounted blood bags is relatively cold and can effect rapid freezing. On the other hand, if the incoming air had been forced to travel through all of the rearwardly disposed bags before arriving at the forwardly placed ones the temperature of the cooling air would have risen substantially by the absorption of heat from the rearwardly located hung blood bag and hence would be capable of absorbing relatively little heat from the forwardly placed unit. Additionally, the extension of the top panel 27 substantially forward prevents an effective short circuiting of the inflowing air upward through the open grid of the hanger rods and directly back to the blower 19 without moving forward past the forwardly placed blood bags.

A final consideration involved in the freezing compartment is that the floor 20 must be spaced sufficiently below the bottom edges of the blood bag rows so that some of the air coming inward from the compartment rear is enabled to sweep directly forward below the rearwardly placed rows of blood bags and then sweep upward through the more forwardly placed ones, this air moving across the top of the floor 20 being, of course, at substantially the same low temperature at which it is delivered into the compartment. Thus, the factors to be taken into consideration in properly designing such a freezing compartment are the size of the opening at the freezing compartment rear, the size of the opening at the forward top of the freezing compartment, the spacing of the compartment floor below the bottoms of the hung blood bags, and the slope of the hanger rods 25 from rear to front resulting in successively lower positioning of each forwardly placed row of the hung blood bags.

FIGURE 2 differs from FIGURE 5 in that FIGURE 2 will be observed to illustrate the freezing compartment floor 20 as being oriented in a substantially horizontal plane rather than on an incline. The horizontal orientation of the floor 20 permits a greater proportion of the cold air which is entering the rear of the freezing compartment to sweep down across the floor and below the rearwardly hung blood bags so that a higher proportion of colder air reaches the more forwardly hung blood bags to effect even quicker freezing thereof. By properly proportioning the various parameters involved in the freezing compartment structure, such as the relative sizes of the compartment rear opening and compartment top forward opening, the incline of the hanger rods 25 and the slope of the freezing compartment floor 20, it is possible to achieve substantially uniform freezing conditions throughout the entire compartment.

These various parameters will, of course, vary from any given coordinated set dependent upon differences in the size and shape of the freezing compartment, and the cooling capacity and geometric relationship of the cooling system to the freezing compartment. By way of illustration, a differently constructed refrigerating apparatus within which it is desired to place such a freezing compartment might be constructed with the hanger rod rack oriented for example with a slope of eight or ten degrees, the floor 20 may be inclined at an angle somewhere between the horizontal and the inclination of the hanger rod rack, the back of the freezing compartment may be a variably perforated member instead of being completely open, and the size and location of the illustrated forward top opening of the freezer compartment might well be other than that as illustrated.

Having now described our invention in connection with particularly illustrated embodiments thereof, it will be understood that variations and modifications may now naturally occur to those persons normally skilled in the art without departing from the essential scope or spirit of our invention, and accordingly, it is intended to claim the same broadly as well as specifically as indicated by the appended claims.

What is claimed as new and useful is:

1. Refrigerating apparatus including a quick-freeze compartment and a forced air cooling system for cooling and circulating air through the quick-freeze compartment, said quick-freeze compartment comprising a generally imperforate walled enclosure having an inlet and an outlet through which inlet and outlet respectively cold air from the cooling system enters and is withdrawn after passing through the compartment, supporting means within the enclosure from which the articles to be frozen may be suspended at different elevations, said supporting means being so disposed in the enclosure relative to the inlet and outlet that some of the incoming cold air passes through the entire article suspension region before being withdrawn through the outlet while the remainder of the incoming cold air divides into plural flow paths, each of which flow paths passes through only a portion of the entire article suspension region before being withdrawn through the outlet.

2. Refrigerating apparatus including a quick-freeze compartment and a forced air cooling system for cooling and circulating air through the quick-freeze compartment, said quick-freeze compartment comprising a generally imperforate walled enclosure having an inlet and an outlet through which inlet and outlet respectively cold air from the cooling system enters and is withdrawn after passing through the compartment, inclined supporting means within the enclosure from which the articles to be frozen may be suspended at different elevations, said supporting means being so disposed in the enclosure relative to the inlet and outlet that some of the incoming cold air passes through the entire article suspension region before being withdrawn through the outlet while the remainder of the incoming cold air divides into plural flow paths, each of which flow paths passes through only a portion of the entire article suspension region before being withdrawn through the outlet.

3. Refrigerating apparatus including a quick-freeze compartment and a forced air cooling system for cooling and circulating air through the quick-freeze compartment, said quick-freeze compartment comprising a generally imperforate walled enclosure having a front wall and a top wall with an outlet therein located proximate the compartment front wall and having a rear wall with an inlet therein, means for injecting cold air from the cooling system into the compartment through the inlet and withdrawing the injected air from the compartment through the outlet, article supporting means disposed within the enclosure and inclined upward from the front wall toward the rear wall for suspending therefrom at different elevations in the air flow through the enclosure articles to be frozen, said supporting means being so disposed relative to the inlet and outlet that some of the injected cold air passes through the entire article suspension region before being withdrawn through the outlet while the remainder of the injected cold air divides into plural flow paths, each of which flow paths passes through only a portion of the entire article suspension region before being withdrawn through the outlet.

4. The apparatus according to claim 3 further including, a frozen article storage section coupled to the forced air cooling system by a distributor duct having an inlet connecting to the cooled air supply flowing from the cooling system, which duct includes means for discharging cooled air into said storage section, and air return means for returning the air discharged into said storage section to the cooling system for recooling and recirculation.

5. The apparatus according to claim 3 further including a frozen article storage section coupled to the forced air cooling system by a distributor duct having an inlet connecting to the cooled air supply flowing from the cooling system, which duct includes means for discharging cooled air into said storage section, and air return means for returning the air discharged into said storage section to the cooling system for recooling and recirculation, and means for proportioning the flow of cooled air through said quick-freeze compartment and through said distributor duct.

6. The apparatus according to claim 5 wherein said quick-freeze compartment inlet and said distributor duct inlet are commonly fed from the cooling system, and wherein said air proportioning means comprises a variable closure for said quick-freeze compartment outlet, whereby when said outlet closure is completely open the major portion of the air flow is through said quick-freeze compartment and when said outlet closure is closed substantially the entire air flow is through the distributor duct and storage section.

7. Freezer apparatus comprising in combination, means for cooling air below the freezing temperature of water, a quick-freeze compartment for rapidly freezing articles placed therein, a storage section located vertically below said quick-freeze compartment for storing frozen articles, means for circulating cooled air from said cooling means along branch paths through said quick-freeze compartment and said storage section and returning the air to said cooling means for recooling and recirculation, and means for variably proportioning the air flow through the separate paths so that more or less of the cooled air is passed through the quick-freeze compartment as desired, the remainder of the air being thereby passed through the storage section.

8. The apparatus according to claim 7 wherein said circulating means comprises, a blower located adjacent said cooling means for forcing the air therethrough for cooling the same after withdrawing the air from the quick-freeze compartment and storage section, an air distribution system for guiding the cooled air from the cooling means into the quick-freeze compartment and into a distributing duct for distribution throughout the storage section, an air return means from said storage section to said blower and an air return means from said quick-freeze compartment to said blower.

9. The apparatus according to claim 7 wherein said circulating means comprises, a blower located adjacent said cooling means for forcing the air therethrough for cooling the same after withdrawing the air from the quick-freeze compartment and storage section, an air distribution system for guiding the cooled air from the cooling means into the quick-freeze compartment and into a distributing duct for distribution throughout the storage section, an air return means from said storage section to said blower and an air reurn means from said quick-freeze compartment to said blower, said quick-freeze compartment having imperforate front, side and bottom walls, and said storage section comprising a plurality of vertically positioned drawers having perforate side, bottom and rear walls, said distributing duct injecting cooled air into the storage section through the perforate rear walls of the said drawers, and the said air return means from said storage section including the air flow paths upward and outward through the perforate bottoms and sides of the drawers.

10. The apparatus according to claim 7 wherein said quick-freeze compartment comprises a walled enclosure having imperforate front, side and bottom walls, an apertured rear wall through which cooled air is injected into the compartment from said circulating means, and an apertured top wall through which air is withdrawn from the compartment by said circulating means, article supporting means within the enclosure disposed below the top wall for supporting articles for freezing of a substantially uniform predetermined height, the compartment bottom wall being spaced below the article supporting means by an amount sufficient to provide a substantial vertical clearance between the said bottom wall and the bottoms of the supported articles, whereby a portion of the injected air sweeps below some of the supported articles and then upward around and between others of the supported articles before being withdrawn from the compartment, while the remainder of the injected air sweeps directly around and between substantially all of the supported articles and is then withdrawn from the compartment.

11. The apparatus according to claim 10 wherein the said article supporting means is disposed within the enclosure so that it supports the articles to be frozen with their bottoms lying substantially in a plane which inclines upward from the enclosure front wall toward the rear wall, and wherein said below lying enclosure bottom wall is similarly inclined from the enclosure front wall to the enclosure rear wall in substantially parallel relationship to the plane defined by the bottoms of the supported articles.

12. The apparatus according to claim 10 wherein the said article supporting means is disposed within the enclosure so that it supports the articles to be frozen with their bottoms lying substantially in a plane which inclines upward from the enclosure front wall toward the rear wall, and wherein said below lying enclosure bottom wall extends substantially horizontally between the enclosure front and rear walls.

13. Refrigerating apparatus including a freezer compartment and a forced air cooling system for cooling and circulating air through the freezer compartment, said freezer compartment comprising an enclosure having imperforate front, side and bottom walls, and apertured rear and top walls, said rear wall being apertured substantially from the top wall to the bottom wall, said top wall being apertured from one side wall to the other side wall for a distance extending rearward from the front wall, the cooling system including means for injecting cold air into the compartment through the apertured rear wall and withdrawing the injected air through the apertured top wall, article supporting means within the enclosure disposed below the top wall and extending substantially from side-to-side and front-to-back therewithin for vertically suspending therefrom for freezing articles of a substantially uniform predetermined height, the compartment bottom wall being spaced below the article supporting means by an amount sufficient to provide therebetween a vertical clearance substantially greater than the vertical distance between the supporting means and the bottoms of the suspended articles, whereby a portion of the air injected through the rear of the compartment sweeps below some of the suspended articles and then upward around and between others of the suspended articles before being withdrawn from the compartment through the front apertured top wall, while the remainder of the injected air sweeps directly around and between substantially all of the suspended articles and is then withdrawn from the compartment through the apertured top wall.

References Cited in the file of this patent
UNITED STATES PATENTS

| | | |
|---|---|---|
| 2,730,867 | Salisbury | Jan. 18, 1956 |
| 2,763,136 | Salisbury | Sept. 18, 1956 |
| 2,863,300 | Murphy | Dec. 9, 1958 |
| 2,907,180 | Mann | Oct. 6, 1959 |